United States Patent
Kajita

(10) Patent No.: US 7,402,960 B2
(45) Date of Patent: Jul. 22, 2008

(54) LED-BASED LAMP APPARATUS

(75) Inventor: Yuji Kajita, Chita-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/651,131

(22) Filed: Jan. 9, 2007

(65) Prior Publication Data

US 2007/0159736 A1    Jul. 12, 2007

(30) Foreign Application Priority Data

Jan. 12, 2006    (JP)    ............................. 2006-004345

(51) Int. Cl.
*H05B 37/02* (2006.01)
(52) U.S. Cl. .................. 315/291; 315/224; 315/225; 315/127; 315/312; 323/276; 323/278; 323/271; 363/80; 363/74
(58) Field of Classification Search .......... 315/291, 315/224, 225, 127, 312, 247, 122, 77, 169.3; 323/276, 278, 271, 270, 273, 274, 277; 363/73, 363/74, 80, 82
See application file for complete search history.

(56) References Cited

U.S. PATENT DOCUMENTS

| | | | | |
|---|---|---|---|---|
| 5,521,838 A | * | 5/1996 | Rosendahl | 700/295 |
| 5,765,940 A | * | 6/1998 | Levy et al. | 362/240 |
| 6,362,578 B1 | * | 3/2002 | Swanson et al. | 315/307 |
| 6,400,101 B1 | * | 6/2002 | Biebl et al. | 315/291 |
| 6,870,328 B2 | | 3/2005 | Tanabe et al. | |
| 7,081,742 B2 | * | 7/2006 | Ito et al. | 323/273 |
| 2001/0033503 A1 | * | 10/2001 | Hamp et al. | 363/73 |
| 2005/0248322 A1 | * | 11/2005 | Kagemoto et al. | 323/220 |

* cited by examiner

*Primary Examiner*—Haissa Philogene
(74) *Attorney, Agent, or Firm*—Harness, Dickey & Pierce, PLC

(57) ABSTRACT

A LED-based lamp apparatus includes a LED unit having multiple LEDs connected in series, a step-up circuit for stepping up a power supply voltage by a switching action of a switching element to supply an electric current to the LED unit, a sensing element for measuring a value of the current, and a controlling element connected in series with the LED unit to control the current based on the measured current value. When some of the LEDs of the LED unit are broken and short-circuited due to, for example, long-term use, the current increases instantaneously and an overcurrent condition occurs. In this case, the controlling element limits the current immediately to correct the overcurrent condition. Thus, the controlling element prevents the overcurrent condition from causing a secondary failure to normal LEDs of the LED unit.

4 Claims, 1 Drawing Sheet

(1)

LED-BASED LAMP APPARATUS

CROSS REFERENCE TO RELATED APPLICATION

This application is based on and incorporates herein by reference Japanese Patent Application No. 2006-4345 filed on Jan. 12, 2006.

FIELD OF THE INVENTION

The present invention relates to a light emitting diode (LED)-based lamp apparatus.

BACKGROUND OF THE INVENTION

A vehicle headlamp or foglamp has been proposed that uses a LED as a light source. For example, a LED-based lamp apparatus disclosed in U.S. Pat. No. 6,870,328B2 corresponding to JP-2004-51014A includes a LED unit constructed with multiple LEDs connected in series. A battery voltage is stepped-up by a booster circuit and then applied to the LED unit. The booster circuit is a chopper circuit constructed with a transistor and a coil. In the booster circuit, a switching action of the transistor is controlled to drive the LED unit by a constant current.

Some of the LEDs of the LED unit may be broken and short-circuited due to, for example, long-term use. In this case, the constant current flowing through the LED unit increases instantaneously and an overcurrent condition occurs. In the LED-based lamp apparatus, the switching action of the transistor of the booster circuit is changed to correct the overcurrent condition.

However, there is a time lag between when the switching action of the transistor is changed and when the current starts to decrease. As a result, the overcurrent condition lasts for a relatively long time and a secondary failure is caused to normal LEDs of the LED unit. Since the LED-based lamp apparatus is used under severe operating conditions such as temperature, and the amount of the current, the secondary failure is likely to be caused due to the overcurrent condition. Therefore, it is preferable to reduce the current as soon as possible after the overcurrent condition occurs.

SUMMARY OF THE INVENTION

In view of the above-described problem, it is an object of the present invention to provide a LED-based lamp apparatus having a plurality of LEDs connected in series and a controlling element for immediately correcting overcurrent condition caused by a short-circuit of the LEDs.

A LED-based lamp apparatus includes a LED unit having multiple LEDs connected in series, a step-up circuit for stepping up a power supply voltage to supply a constant current to the LED unit, a sensing element for measuring a value of the current, and a controlling element connected in series with the LED unit to control the current based on the measured current value.

The LED-based lamp apparatus uses the LED unit as a light source. The step-up circuit has a switching element and steps up the power supply voltage by a switching action of the switching element.

When some of the LEDs of the LED unit are broken and short-circuited due to, for example, long-term use, the current increases instantaneously and an overcurrent condition occurs. In this case, the controlling element limits the current immediately to correct the overcurrent condition. Thus, the controlling element prevents the overcurrent condition from causing a secondary failure to normal LEDs of the LED unit.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
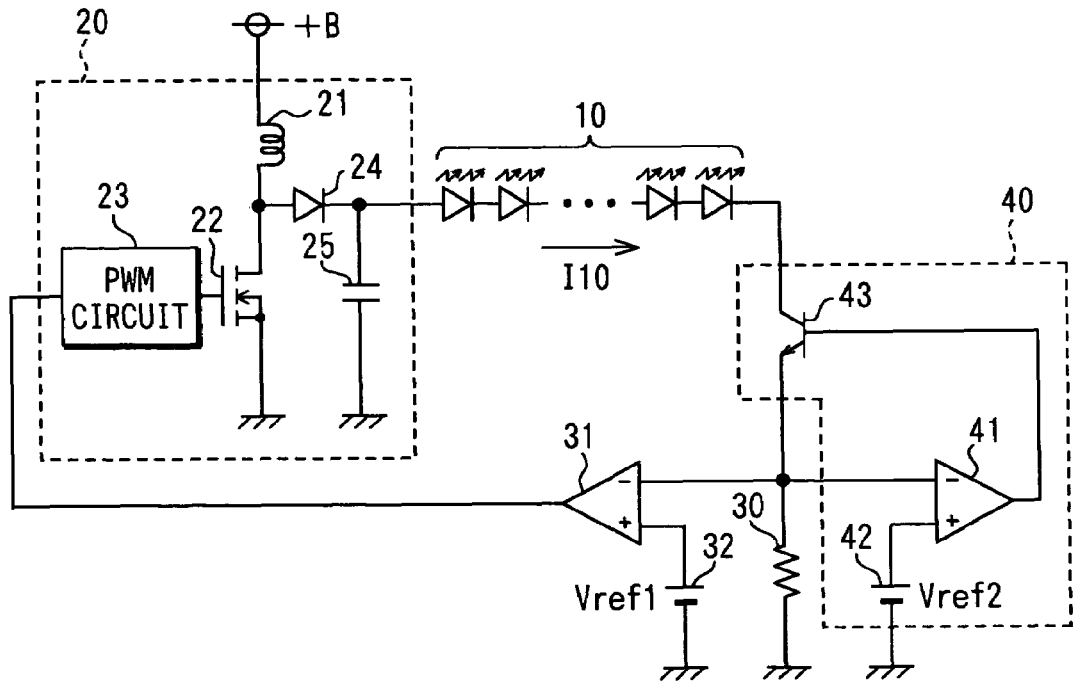
FIG. 1 is a schematic of a LED-based lamp apparatus according to an embodiment of the present invention.

Referring to FIG. 1, a LED-based lamp apparatus for a vehicle includes a LED unit 10, a direct current-to-direct current (DC-DC) converter 20, a resistor 30 acting as a sensing element, a first operational amplifier (op-amp) 31, a first power source 32 having a first voltage Vref1, and an overcurrent protection circuit 40.

The LED unit 10 includes multiple LEDs connected in series. The DC-DC converter 20 includes an inductor 21, a metal oxide semiconductor field effect transistor (MOSFET) 22 acting as a switching element, a pulse width modulation (PWM) circuit 23, a diode 24, and a capacitor 25. The overcurrent protection circuit 40 includes a second op-amp 41, and a second power source 42 having a second voltage Vref2, and a bipolar transistor 43 acting as a controlling element.

The LED unit 10 has one end connected to the DC-DC converter 20 and the other end connected to ground through the resistor 30 and the transistor 43.

The battery voltage +B is 12 volts (V) or 24 V and insufficient to energize all the LEDs of the LED unit 10. Therefore, the DC-DC converter 20 steps up a voltage +B of a vehicle battery. In this embodiment, the battery voltage +B is stepped up to about 90 V to supply an electric current I10 of about 0.7 amperes (A) to the LED unit 10.

In the DC-DC converter 20, the inductor 21 has one end connected to the battery and the other end connected to the ground through the MOSFET 22. The PWM circuit 23 has an output terminal connected to a gate of the MOSFET 22 and outputs a PWM signal to the gate of the MOSFET 22. Thus, the MOSFET 22 performs a switching action based on the PWM signal. The PWM circuit 23 controls the switching action of the MOSFET 22 by changing a duty ratio of the PWM signal. The diode 24 has a cathode connected to the LED unit 10 and an anode connected between the inductor 21 and the MOSFET 22. The diode 24 prevents a reverse current flowing from the LED unit 10 to the DC-DC converter 20. The capacitor 25 has one end connected between the LED unit 10 and the cathode of the diode 24 and the other end connected to the ground. The capacitor 25 acts as a smoothing capacitor.

When the MOSFET 22 performs the switching action based on the PWM signal output from the PWM circuit 23, a voltage higher than the battery voltage +B is induced across the inductor 21. Thus, the battery voltage +B is stepped up to about 90 V.

The PWM circuit 23 changes the duty ratio of the PWM signal based on a value of the current I10 flowing through the LED unit 10 as follows:

The current I10 flows from the LED unit 10 to the resistor 30 through the transistor 43. Then, a voltage equivalent to the value of the current I10 appears across the resistor 30 so that the current I10 can be measured from the voltage across the resistor 30. Thus, the resistor 30 acts as the sensing element for measuring the value of the current I10.

The first op-amp 31 has an inverting input terminal connected to the resistor 30 and a non-inverting input terminal connected to the first power source 32 having the first voltage Vref1. Therefore, the voltage equivalent to the amount of the current I10 is applied to the non-inverting input terminal of the first op-amp 31 and the first voltage Vref1 is applied to the inverting input terminal of the first op-amp 31. The first voltage Vref1 is equivalent to a target current value X1 (i.e., 0.7 A) of the current I10.

The first op-amp 31 has an output terminal connected to the PWM circuit 23 of the DC-DC converter 20 and the PWM circuit 23 changes the duty ratio of the PWM signal based on an output of the first op-amp 31.

Specifically, when the current I10 is less than the target current value X1, the duty ratio is raised. As a result, the output voltage of the DC-DC converter 20 increases so that the current I10 also increases. In contrast, when the current I10 is greater than the target current value X1, the duty ratio is reduced. As a result, the output voltage of the DC-DC converter 20 decreases so that the current I10 also decreases. Thus, the PWM circuit 23 changes the duty ratio of the PWM signal based on the current I10.

As shown in FIG. 1, the resistor 30 is also connected to an inverting input terminal of the second op-amp 41 of the overcurrent protection circuit 40. A non-inverting input terminal of the second op-amp 41 is connected to the second power source 42 having the second voltage Vref2. Therefore, the voltage equivalent to the value of the current I10 is also applied to the inverting input terminal of the second op-amp 41 and the second voltage Vref2 is applied to the non-inverting input terminal of the second op-amp 41. The second voltage Vref2 is equivalent to a threshold current value X2 greater than the target current value X1. In short, the first voltage Vref1 is greater than the second voltage Vref2. An output terminal of the second op-amp 41 is connected to a base of the transistor 43 so that the transistor 43 controls the current I10 based on the output of the second op-amp 41.

Specifically, when the current I10 is less than the threshold current value X2, the transistor 43 is fully on. In contrast, when the current I10 is greater than the threshold current value X2, the transistor 43 is partially on to limit the current I10. Thus, the transistor 43 corrects overcurrent condition occurring in the LED unit 10.

A switch (not shown) operated by a driver is connected in series with the LED unit 10. When the driver turns on the switch, the LED unit 10 is energized and when the driver turns off the switch, the LED unit 10 is reenergized.

Figure 2:
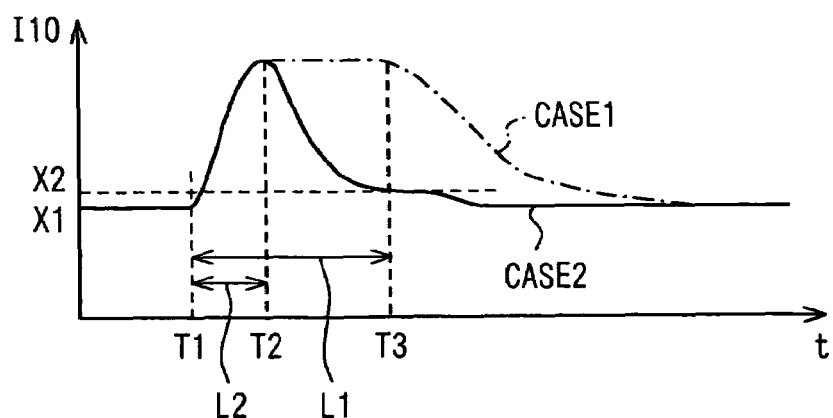
FIG. 2 is a graph illustrating an advantage of an overcurrent protection circuit in the LED-based apparatus of FIG. 1.

When some of the LEDs of the LED unit 10 are broken and short-circuited due to, for example, long-term use, the current I10 changes as shown in FIG. 2. In FIG. 2, a dashed line represents a case 1 where the LED-based lamp apparatus does not includes the overcurrent protection circuit 40 and a solid line represents a case 2 where the LED-based lamp apparatus includes the overcurrent protection circuit 40. The current I10 starts to increase at a time T1 due to the short circuit of the LEDs of the LED unit 10.

In the case 1, when the current I10 increases above the target current value X1, the PWM circuit 23 changes the switching action of the MOSFET 22 to reduce the output voltage of the DC-DC converter 20, thereby reducing the current I10. As shown in FIG. 2, there is a first time lag L1 between the time T1 when the current I10 increases above the target current value X1 and a time T3 when the change in the switching action is reflected in the output voltage of the DC-DC converter 20 and the current I10 starts to decrease. Therefore, even after the PWM circuit 23 changes the switching action of the MOSFET 22 to reduce the output voltage of the DC-DC converter 20, the overcurrent condition in the LED unit 10 lasts for a relatively long time. As a result, a secondary failure may be caused to normal LEDs of the LED unit 10.

In contrast, in the case 2, when the current I10 increases above the threshold current value X2, the transistor 43 of the overcurrent protection circuit 40 limits the current I10 immediately. As a result, the current I10 starts to decrease at a time T2 earlier than the time T3. In other words, a second time lag L2 between the times T1, T2 is less than the first time lag L1 between the times T1, T3. Thus, the overcurrent protection circuit 40 corrects the overcurrent condition immediately to prevent the secondary failure. Further, when the current I10 varies around the target value X1 (i.e., below the threshold current value X2), the PWM circuit 23 changes the switching action of the MOSFET 22 to keep the current I10 to the target value X1. In such an approach, electric power consumed by the transistor 43 can be reduced. As a result, heat generated by the transistor 43 is also reduced so that reduction in performance of the transistor 43 due to the heat can be prevented.

In the LED-based lamp apparatus according to the embodiment, the transistor 43 of the overcurrent protection circuit 40 is connected in series with the LED unit 10. The transistor 43 controls the current I10 based on the current value measured by the resistor 30 acting as the sensing element. When the overcurrent condition occurs due to the short-circuit of the LEDs of the LED unit 10, the transistor 43 limits the current I10 immediately. Thus, the transistor 43 corrects the overcurrent condition immediately to prevent the overcurrent condition from causing the secondary failure to the normal LEDs of the LED unit 10.

Since the overcurrent condition is corrected immediately, the LED-based lamp apparatus can be used under severe operating conditions such as temperature and the value of the current. Therefore, the LED-based lamp apparatus can be used for in-vehicle apparatus such as a headlamp, or a foglamp.

(Modifications)

The embodiment described above may be modified in various ways. For example, the transistor 43 may be provided on the anode side of the LED unit 10.

Various types of semiconductor elements such as a field effect transistor (FET) can be used instead of the transistor 43.

The DC-DC converter 20 may include a transformer instead of the inductor 21 to step up the battery voltage +B.

The LED based lamp apparatus may further include means for monitoring parameters related to the LED unit 10. For example, the monitoring means monitors actual run time of the LED unit 10 and/or the ambient temperature of the LED unit 10. The threshold current value X2 is adjusted based on the monitored parameters. In such an approach, even when the characteristic of the LED unit 10 changes due to deterioration over time or the ambient temperature, the current I10 is precisely controlled.

Such changes and modifications are to be understood as being within the scope of the present invention as defined by the appended claims.

What is claimed is:

1. A lamp apparatus comprising:
   a LED unit including a plurality of light emitting diodes connected in series;

a circuit including a switching element and for stepping up a power supply voltage by a switching action of the switching element to supply an electric current to the LED unit;

a sensing element for measuring a value of the current; and a controlling element connected in series with the LED unit to control the current based on the measured current value.

2. The lamp apparatus according to claim 1, wherein the controlling element controls the current when the measured current value is equal to or greater than a predetermined threshold value.

3. The lamp apparatus according to claim 2, wherein the circuit changes the switching action of the switching element such that the current supplied to the LED unit is kept constant at a predetermined target value less than the threshold value.

4. The lamp apparatus according to claim 1, wherein the sensing element is a resistor connected in series with the LED unit to produce a voltage drop equivalent to the value of the current, and the controlling element is a transistor having a control terminal to which a signal depending on the voltage drop is applied.

* * * * *